Nov. 22, 1966  E. FRISCH  3,287,231
FUEL ELEMENT ASSEMBLY FOR A NEUTRONIC REACTOR
Original Filed Jan. 23, 1957  2 Sheets-Sheet 1

Nov. 22, 1966  E. FRISCH  3,287,231
FUEL ELEMENT ASSEMBLY FOR A NEUTRONIC REACTOR
Original Filed Jan. 23, 1957  2 Sheets-Sheet 2

WITNESSES
Edwin E. Bassler
Donald J. Smith

INVENTOR
Erling Frisch
BY
Arthur T. Stratton
ATTORNEY

United States Patent Office 3,287,231
Patented Nov. 22, 1966

3,287,231
FUEL ELEMENT ASSEMBLY FOR A NEUTRONIC REACTOR
Erling Frisch, Pittsburgh, Pa., assignor to Westinghouse Electric Corporation, East Pittsburgh, Pa., a corporation of Pennsylvania
Continuation of application Ser. No. 635,911, Jan. 23, 1957. This application May 15, 1961, Ser. No. 124,250
10 Claims. (Cl. 176—78)

This application is a continuation of copending application Serial No. 635,911, by Erling Frisch, filed January 23, 1957, assigned to the instant assignee, and now abandoned.

The present invention relates to a fuel element assembly for a neutronic reactor and, more particularly, to a continuous rod type assembly adapted for use within a heterogeneous water-cooled type of reactor.

In the generation of nuclear power by the development of a chain reaction within a fissionable isotope suspended within a reactor vessel, it is necessary to distribute the fissionable isotope in a manner to permit the adequate cooling of the fissionable material. In furtherance of this purpose, fissionable isotopes, such as natural uranium, which may be enriched with $U^{235}$, $U^{233}$ or $Pu^{239}$, is provided in the form of elongated rods which are supported in a spaced array within the reactor vessel. The fuel rods frequently are formed into external assemblies for the convenient mounting thereof within the reactor core. When thus mounted, suitable spaces are provided between some of the assemblies for the insertion of control rods in order properly to control the progress of the chain reaction.

In order to protect the fissionable material from the corrosive effects of the high temperature pressurized water utilized in the coolant system of the reactor of the character described, it is necessary to encase the fissionable isotope within a suitable corrosion-resistant material. Because of the considerable length of the fuel rods employed within the reactor core, the casing material and associated structural components have heretofore been made of considerable mass or thickness in order to support properly the fuel elements. In many cases the required mass of structural material increased the importance of utilizing material having a low neutronic absorption cross section.

The fuel rods employed in present or proposed pressurized water reactors frequently are provided with a total length in the order of 9 feet and with an outside diameter in the order of 0.3 inch. The slenderness of the fuel rods has greatly magnified the problem of providing adequate support necessary to prevent the closely spaced and elongated fuel rods from bending or sagging and thereby restricting the coolant passages therebetween. Heretofore it has been proposed to furnish the fuel rod assemblies in the form of tandemly-connected subassemblies of fuel rod segments and to support these segments by an arrangement of end plates and tie rods, or the like.

In these prior arrangements, the employment of the tandemly-connected subassemblies and the accompanying structural components increases greatly the structural material associated with the reactor fuel and, thus, has made imperative the selection of a structural materal having a low neutronic absorption cross section. In some respects, zirconium or one of its alloys is an ideal material for this purpose, because of its low neutronic absorption cross section and its high corrosion-resistance to water at the customary operating temperatures of pressurized water reactors. On the other hand, the cost of the zirconium material is rendered exorbitant because of the initial high cost thereof and because of the extreme difficulty in working the material into fuel rod casings or tubing and other structural components of the fuel assembly. Another disadvantageous aspect of utilizing a zirconium base material results from the fact that welding of this material must be performed in an inert atmosphere and that special precautions must be undertaken to avoid zirconium fires whenever working with this material.

It is advantageous, in an effort to lower the cost of producing reactor cores, to utilize less expensive materials, such as stainless steels, for the structural members of the core. Stainless steels have excellent corrosion resistant properties and are easier and less expensive to handle and to form into the desired shapes, but have a much higher absorption cross section than zirconium-base materials.

Because of this higher cross section, it is imperative that the amount of stainless steel structural materials in the core be reduced to a minimum, for otherwise the uranium inventory and the size of the core must be increased to a point at which the economic advantage stemming from employment of stainless steels is lost. For these reasons the priorly proposed methods of assembling fuel rods by means of a series of end plates are unsatisfactory.

Accordingly, an object of the present invention is to increase the efficiency of and to reduce the cost of a fuel element assembly of the character described.

Another object of the invention is to furnish an improved method and arrangement for forming and supporting the fuel rods of the assembly. More specifically, it is an object of the invention to reduce the thickness of the casing of the individual fuel rods and to minimize the number of structural components associated with the fuel rod assembly.

Further objects of the invention are to facilitate the passage of coolant flowing between the fuel rods of the assembly and to minimize the spacing required for adequate coolant flow therebetween.

Still another object of the invention is to reduce the complexity of and to minimize the constructional time required in the fabrication of the individual fuel rods and of the assembly formed therefrom.

A further object of the invention is to obviate sagging or bending of the individual fuel rods in the assembly, under the influence of the weight thereof or of the heat developed within the reactor core or vibrational energies induced by the necessarily high volume of coolant flow.

The foregoing and other objects, features and advantages of the invention will be made apparent during the ensuing description of exemplary forms thereof, with the description being taken in conjunction with the accompanying drawings, wherein.

According to the invention, means are provided for assembling a relatively large number of elongated fuel rods or the like in a manner reducing the mass of structural material, thus obviating the employment of complex supporting structures, such as are required for tandemly connected fuel assemblies with their accompanying end plates, tie rods, and the like. By eliminating the aforesaid supporting structures, the flow of coolant through the fuel element assembly is facilitated and the fuel rods may be furnished in a closer spaced area, where desired. As stated heretofore, the individual fuel rods, when assembled according to the invention, can extend substantially the entire length of the fuel rod assembly with the result that fabrication and supporting of individual fuel rods is facilitated. The means utilized to space and support the fuel rods within the assembly are so arranged along the length of the fuel rod assembly that bending or sagging of the assembly is minimized and relative movement between the individual fuel rods of the assembly is prevented in a similar manner. With this arrangement, an adequate coolant flow relative to the individual fuel rod is ensured and the development of hot spots within the reactor core as the result of the constriction of flow passages resulting from relative movement between adjacent fuel element assemblies or between adjacent fuel rods within an assembly is prevented in a positive manner.

Figure 1:
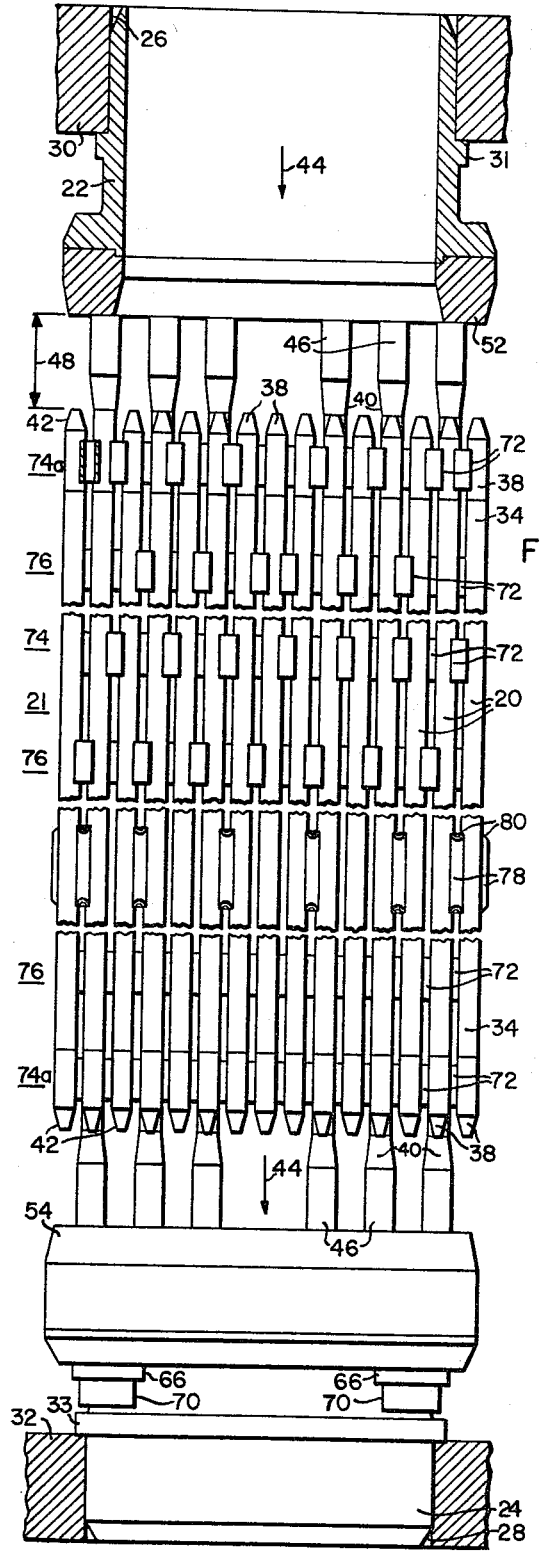
FIGURE 1 is an elevational view, partly in section, of one form of fuel rod assembly constructed in accordance with the teachings of this invention.
Figure 2:
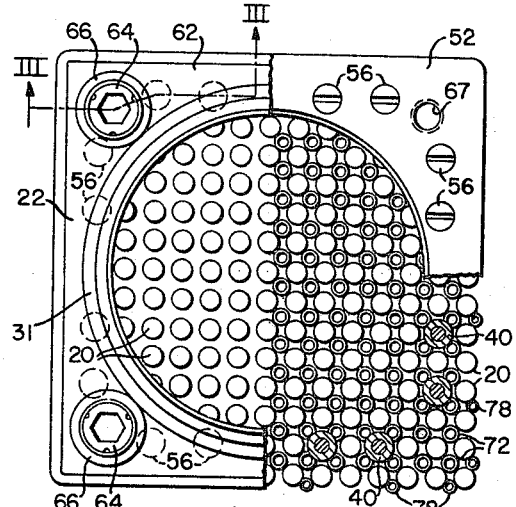
FIG. 2 is an end view of the assembly shown in FIG. 1, parts having been broken away and other parts removed in order to more clearly show the invention.
Figure 3:
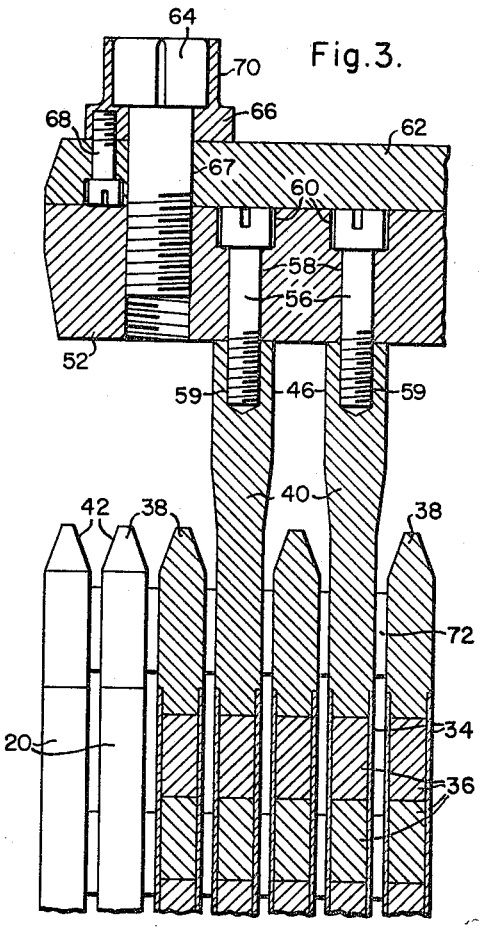
FIG. 3 is a partial sectional view taken along reference lines III—III of FIG. 2.

Referring now more particularly to FIGS. 1 to 3 of the drawings, the exemplary form of the invention shown therein comprises a plurality of elongated fuel elements or rods 20 with means associated therewith for securing the fuel rods to one another in the lateral direction to form a bundle 21 thereof and other means for joining the bundle 21 of fuel rods endwise to a pair of flow nozzles or flow-conducting and assembly-supporting members 22 and 24. The nozzles 22 and 24 are inserted respectively into apertures 26 and 28 suitably provided in reactor core supporting plates indicated generally by the reference characters 30 and 32. When thus inserted, the nozzles are positioned relative to the core supporting plates by shoulders 31 and 33, respectively, bearing thereagainst.

As better shown in FIG. 3 of the drawings, each of the fuel rods 20 is provided with a protective cladding material or casing 34. Inserted into each of the casings 34 and extending substantially along the length thereof are a plurality of pellets 36 formed from a suitable nuclear fuel, which in this example of the invention is uranium oxide. The fuel rods 20 are each provided at the ends thereof with an end plug or plug member 38 or 40, which is welded or otherwise hermetically sealed to the fuel rod casing 34. The outward or free extremities of the end plugs 38 are tapered, as indicated by the reference character 42, in order to minimize turbulence and concomitant frictional losses in the coolant water flowing through the nozzles 22 and 24, as indicated by the flow arrows 44.

The fuel rod bundle 21 is secured to and supported by the nozzles 22 and 24 by securing the elongated end plugs 40 to the flow nozzles and associated structural components. The end plugs 40 are each provided with an outwardly extending projection or shank portion 46 having such length as to space the nozzles 22 and 24 and their associated structural components a suitable distance 48 (FIG. 1) from the outward extremities of the end plugs 38. When spaced in this fashion, the turbulence in the coolant water flowing relative to the inward end of the flow nozzle 22 or 24 is diminished and an adequate flow of coolant water to all of the flow passages in the fuel element assembly is ensured. The shank portions 46 secured adjacent the outward ends of the elongated end plugs 40 of which, in this example of the invention, sixteen are utilized, are joined respectively to and spaced about the periphery of a pair of mounting rings 52 and 54, as by welding or by other suitable means presently to be described. The mounting rings 52 and 54 then are secured to the nozzles 22 and 24, respectively, in any convenient manner or, alternatively, may be fabricated integrally with the associated nozzles 22 and 24.

One arrangement for assembling the elongated end plugs 40 to the respective nozzles 22 and 24, and the associated mounting rings 52 and 54, includes the use of fillister headed screws 56 (FIGS. 2 and 3) inserted through suitable aperatures 58 provided in the mounting rings 52 and 54, and threaded into tapped holes 59 provided in each of the elongated end plug shanks 46. Each of the apertures 58 are counterbored, as indicated by the reference character 60, in order to seat the fillister head of the screws 56 in a position flush with or below the adjacent surface of the mounting rings 52 and 54. With this arrangement, the mounting rings can be secured contiguously against the surface of a retaining flange 62 formed integrally with each of the flow nozzles 22 and 24 adjacent the inward ends thereof. Thus when the retaining flanges 62 are secured to the respective mounting rings 52 and 54, as by a number of mounting bolts 64, loosening and loss of the fillister-headed screws 56 into the coolant stream of the reactor is prevented in a positive manner.

The loss of the mounting bolts 64 likewise is prevented by a number of cap members 66 secured to each retaining flange 62 and aligned individually with an aperture 67 therein provided for each of the mounting bolts 64. The caps 66 are each secured to the respective retaining flanges 62, before the assembly thereof to the associated mounting ring 52 or 54, by means of one or more machine screws 68. The screws 68 similarly are prevented from loss into the coolant stream of the reactor by the engaging surfaces of the retaining flange 62 and the associated mounting ring 52 or 54 as described heretofore in connection with the fillister-headed screws 56. Each of the caps 66 is furnished with an outwardly extending tubular portion 70 through which the mounting bolt 64 is inserted, and which is adapted to closely fit the head of the mounting bolt. After tightening the mounting bolts 64, the tubular portions 70 are deformed against the outer periphery of the heads of the mounting bolts to prevent positively the turning and loosening thereof.

One means for securing the fuel rods 20 laterally to one another in a spaced array includes the use of a number of relatively short tubular joining members, connectors, or ferrules 72 suitably spaced along the length of the continuous fuel rods 20. The ferrules 72 are formed from a relatively thin structural material, such as stainless steel, and, due to the tubular nature thereof, offer comparatively little obstruction to the flow of coolant water through the flow passages between the fuel rods 20. In order to decrease the obstruction to coolant flow still further, desirably the adjacent ones of the ferrules 72 in this example are displaced laterally in the fuel element assembly to provide in effect a staggered array as indicated by the reference characters 74 and 76 (FIG. 1). The ferrules 72 are brazed or otherwise secured to the fuel rods 20 in a manner that will not affect the hermetically sealed character of the fuel rod casings 34. As better shown in FIG. 2, the total number of ferrules 72 in the staggered arrangements 74 and 76 thereof are arranged to conform to a latticed disposition corresponding to that of the fuel rod arrangement. In one application of the invention wherein fuel rods of the order of 9 feet long are utilized, the staggered array of longitudinally adjacent ones of those ferrules 72 comprising each pair of the groups 74 and 76 are provided at intervals of 12 to 16 inches along the length of the continuous fuel rods 20. Adjacent each end of the fuel rod bundle 21, a portion 74a of the aforesaid staggered array 74 and 76 of the ferrules 72 is secured between the end plugs 38 and 40 in order to lend support thereto and, more specifically, to prevent the impartation of bending strains to the elongated end plugs 40 and to their junction with the mounting plates 52 and 54, of the flow nozzle assemblies, respectively. With this arrangement wherein the fuel rods 20 are each supported and spaced from adjacent fuel rods by means of the ferrules 72, a compact and unitary fuel rod assembly is obtained. The multiple point supporting means distributed along the length of the spaced array of fuel rods 20 prevents the relative movement and bowing thereof and strengthens the entire assembly against the application of bending strains thereto.

In order to space properly each fuel rod assembly from adjacent fuel rod assemblies or from the reactor control rods inserted therebetween in a well-known manner, a number of short spacers or tubes 78 are secured between adjacent fuel rods 20 at the outer periphery of the bundle 21. The ends 80 of each of the spacer tubes 78 are beveled outwardly in order to facilitate relative longitudinal movement between the fuel rod assembly and a control rod (not shown) or an adjacent assembly. Desirably the spacer tubes likewise are distributed along the length and width of the fuel element assembly for this purpose.

Figure 4:
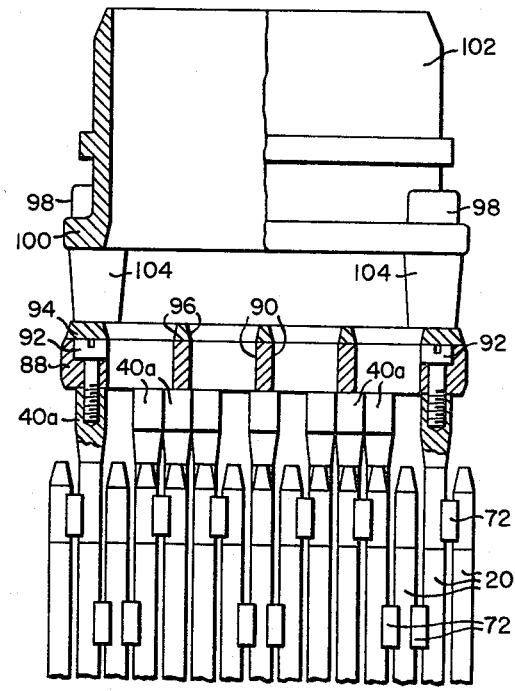
FIG. 4 is an elevational view partly in section of one end of another form of fuel rod assembly constructed in accordance with the invention.
Figure 5:
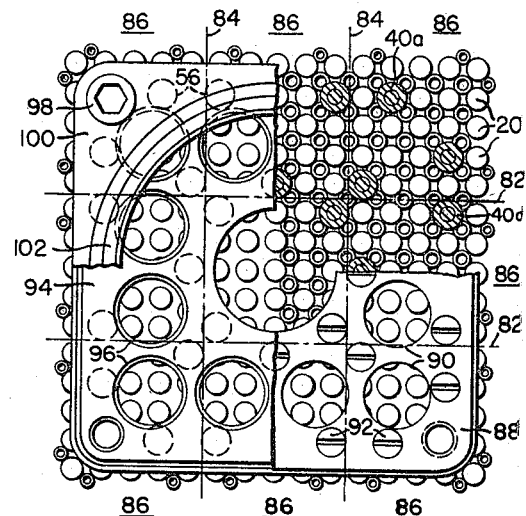
FIG. 5 is an end view of the assembly shown in FIG. 4, parts having been broken away and other parts removed for purposes of clarity.

As indicated in FIG. 5 by the reference lines 82 and 84, the fuel rod assembly may be constructed in the form of a plurality of longitudinally extending subassemblies 86. Each of the subassemblies 86 is arranged to be secured to the mounting plates 88 secured adjacent each end of the fuel rod bundle to the elongated end plugs 40a. Each mounting plate 88 is provided with a plurality of flow holes 90 arranged to furnish sufficient space therebetween for the insertion of fillister-headed screws 92, three or more being utilized in this example of the invention for each subassembly. The screws 92 are threaded into the elongated end plugs 40a, in a manner described heretofore in connection with FIG. 3 of the drawings. Loss of the screws 92 is prevented by retaining plates 94 provided with a series of apertures 96 corresponding with the apertures 90 of the associated mounting plate 88. Each retaining plate 94 is mounted contiguously with the upper surface of the respective mounting plate 88 and thus operates to retain positively the fillister headed screws 92 inserted through the mounting plate 88. The retaining plates 94 are secured in this manner by mounting bolts 98 inserted through a flange 100 of flow nozzles 102 secured at each end of the fuel rod assembly. The flow nozzles 102 are adapted for insertion into the apertures 26 and 28 of the reactor core supporting plates 30 and 32, respectively, as described heretofore in connection with the flow nozzles 22 and 24 illustrated in FIG. 1. In order to provide adequate flow of coolant to all of the flow apertures 90 and 96 and thence to the fuel rods 20 (FIG. 4), the flow nozzle 102 is suitably spaced from the retaining plate 94 and the mounting plate 88 by means of tubular spacers 104 surrounding each of the mounting bolts 98 and individually inserted between the flow nozzle flange 100 and the retaining plate 94.

Figure 6:
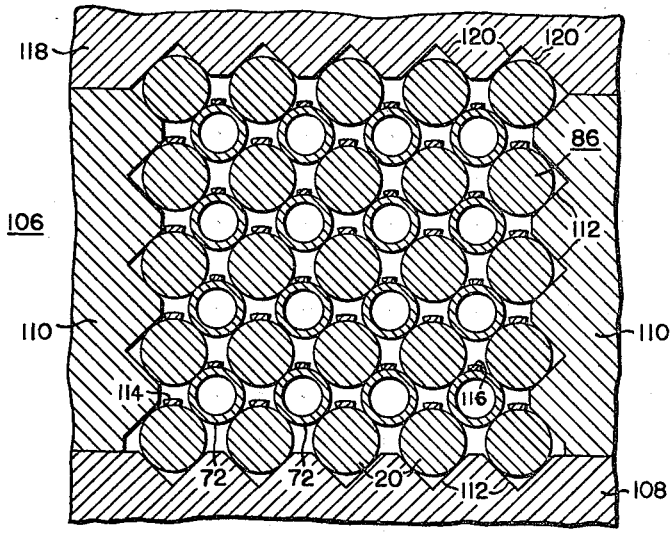
FIG. 6 is a schematic sectional view of a brazing fixture for use in fabricating a fuel rod assembly pursuant to the teachings of the present invention.

The fuel rod bundle 21 or the fuel rod subassembly 86 is formed, in one application of the invention, by placing the fuel rods 20 and the ferrules 72 into a suitable brazing fixture 106, illustrated schematically in FIG. 6 of the drawings. The brazing fixture 106 comprises a lower plate 108 and side plates 110 extending substantially along the entire length of the fuel rods 20. Each of the plates 108 and 110 are provided with a series of V-shaped grooves 112 extending longitudinally of the plates 108 and 110 and arranged to receive and properly space the fuel rods 20 lying at the outer periphery of the fuel bundle 21 or the subassembly 86, with the latter being shown in FIG. 6 for purposes of illustration. After placing the bottom row of fuel rods 20 in the grooves 112 of the bottom plate 108, a number of rows of ferrules 72 are placed thereon and suitably spaced along the length of the fuel rods. A segment 114 of a suitable brazing alloy is then placed on each fuel rod 20 adjacent the spacing ferrule 72, and another segment 116 of brazing material is then placed atop each ferrule 72. Alternatively, the segments 114 and 116 may be applied in paste form from a suitable syringe. Suitable adhesive, is desirably utilized for temporarily securing the brazing segments 116 and 114 to the ferrule 72 and fuel rods 20, respectively. Alternatively, the fuel rods 20 and ferrules 72 can be provided with the aforesaid portions 114 and 116 of brazing material, respectively, prior to disposition within the brazing fixture 106. Each row or layer of fuel rods 20 is then built up in this fashion to form the subassembly 86, after which operation a top plate 118 provided with suitable V-shaped grooves 120, is secured to the brazing fixtures 106. The brazing fixture and the subassembly 86 or fuel bundle 21 contained therewithin is then baked or fired at sufficient temperature to melt the brazing material 114 and 116 and cause it to flow between the contacting surfaces of the rods 20 and ferrules 72 so that upon cooling it will secure the ferrules 72 to the adjacent fuel rods 20. In the event that the casings 34 (FIG. 3) and ferrules 72 are fabricated from stainless steel, one of a number of well-known brazing alloys adapted for brazing stainless steel components can be selected. One example of such alloys is Nicrobraz #50 made by Wall Colmonoy Corporation of Detroit, Michigan, and comprising 9 to 11% phosphorus, 11 to 15% chromium, balance substantially iron.

From the foregoing, it will be apparent that there are disclosed herein novel arrangements of fuel rod assemblies adapted for use within a nuclear reactor. The assembly is characterized by great physical strength in comparison with its size and the number of structural components utilized therefor. As a result of the compact nature of the assembly, a more efficient reactor core can be formulated therefrom, in which the inventory of atomic fuel is reduced and in which an adequate coolant flow in all areas thereof is ensured.

Numerous modifications will occur to those skilled in the art without departing from the scope of the appended claims. Moreover, it is to be understood that certain features of the invention can be utilized without a corresponding use of other features.

I claim as my invention:

1. A fuel rod assembly adapted for use in a neutronic reactor, said assembly comprising a plurality of elongated fuel rods, some of said rods being longer than others and at each end of said assembly having their ends protruding outwardly of the ends of the others of said rods; a plurality of short connectors interposed between said rods and each being rigidly joined to each of the adjacent ones of said rods, said connectors together securing all of said rods laterally and spacedly in rigid engagement to one another; a flow-conducting and assembly-supporting member disposed adjacent each end of said assembly; and means for rigidly securing each of said last-mentioned members only to the adjacent ends respectively of said outwardly protruding rods.

2. The combination of claim 1 wherein said connectors support those rods which are not secured to said conducting and supporting members, said conducting and supporting members and said connectors having fluid conducting passages therethrough which are generally parallel to each other and parallel to said fuel rods so that substantially uninterrupted flow passages are provided longitudinally through said assembly.

3. A fuel rod assembly adapted for use in a neutronic reactor, said assembly comprising a plurality of elongated fuel rods, some of said rods being longer than others and at each end of said assembly extending longitudinally outward of others of said rods; a plurality of short generally tubular connectors each having its outer surface rigidly joined to each of adjacent ones of said rods, said tubular connectors together securing all of said rods laterally and spacedly to one another; a flow-conducting and assembly-supporting member disposed adjacent each end of said assembly; means for securing each of said last-mentioned members only to the adjacent ends respectively of said longitudinally outwardly extending rods, and said connectors being interposed among said rods and spaced along the length thereof to prevent bowing of said rods relative to said assembly, and some of said connectors being displaced generally laterally within said fuel rod assembly and relative to adjacent connectors to minimize resistance thereof to coolant flow through said assembly.

4. A fuel rod assembly adapted for use in a neutronic reactor, said assembly comprising a plurality of elongated encased fuel rods, first plug members inserted into each end of the major proportion of said fuel rods, second plug members inserted into each end of the remainder of said fuel rods, said second plug members each having a longitudinally and outwardly extending projection joined thereto, a flow conducting and assembly supporting member disposed adjacent each end of said assembly, means for rigidly securing each conducting and supporting member to the adjacent ones of said projections, a plurality of relatively short tubular connecting and flow-conducting members disposed among and longitudinally adjacent said first and said second plug members at each end of said assembly respectively, each of said tubular connecting members having its peripheral surface rigidly joined to each of the adjacent ones of said first and said second plug members for spacedly securing said first and said second plug members laterally to one another to provide lateral support for said second plug member projections and thereby for the securance of each of said assembly supporting members to said assembly, and additional flow-conducting means disposed intermediate the ends of said fuel rods and interposed thereamong and rigidly secured to adjacent rods for rigidly securing said fuel rods laterally and spacedly to one another, said last-mentioned means being disposed and shaped to conduct coolant fluid longitudinally of said assembly.

5. A fuel rod assembly adapted for use in a neutronic reactor, said assembly comprising a plurality of elongated fuel rods, first plug members inserted into each end of the major proportion of said fuel rods, second plug members inserted into each end of the remainder of said fuel rods, each of the second plug members at each end of said assembly having a longitudinally and outwardly extending projection joined thereto, said projections extending outwardly beyond said first plug members, a flow conducting and assembly supporting member disposed adjacent each end of said assembly, said first plug members each terminating in a tapered portion extending longitudinally of said assembly and being shaped to minimize resistance thereof to flow of said coolant fluid longitudinally of said assembly, means for rigidly securing each of said conducting and supporting members only to the adjacent ones respectively of said projections, and means of limited longitudinal extent disposed intermediate the ends of said fuel rods and interposed thereamong and rigidly secured to adjacent rods for securing said fuel rods laterally and spacedly to one another, said conducting and supporting members and said fuel rod securing means being shaped to conduct a coolant fluid longitudinally of said assembly so that substantially uninterrupted flow passages are provided longitudinally through said assembly.

6. A fuel rod assembly adapted for use in a neutronic reactor; said assembly comprising a plurality of substantially coextensive, spaced, parallel, elongated fuel rods; a flow-conducting and assembly-supporting member disposed adjacent each end of said assembly; means for securing each of said conducting and supporting members to the adjacent ends of some of said fuel rods; joining members disposed intermediate the ends of said fuel rods, interposed thereamong, and rigidly secured to adjacent rods for securing said fuel rods laterally and spacedly to one another; said conducting and supporting members and said joining members having longitudinally extending flow passages to conduct a coolant fluid longitudinally of said assembly so that substantially uninterrupted flow passages for said coolant are provided longitudinally through said assembly, said joining members being spaced along the length of said fuel rods and some of said joining members being laterally offset relative to longitudinally adjacent ones of said joining members to minimize fluid resistance thereof in a given flow passage.

7. The combination of claim 6 including a plurality of generally tubular spacers fixedly secured laterally to the outer surfaces of adjacent ones of at least some of those fuel rods which are disposed at the outer periphery of said assembly, said spacers being disposed circumferentially and longitudinally of said assembly to space said assembly from adjacent components of said reactor.

8. In a fuel rod assembly adapted for use in a neutronic reactor; the combination comprising a plurality of elongated fuel rods; and a plurality of short joining members extending over only a minor part of the length of said rods and interposed among said rods and disposed at spaced positions along the length thereof, each of said members having its outer surface fixedly and permanently secured laterally to each of adjacent ones of said rods to join all of said rods laterally and spacedly into a rigid bundle.

9. The combination of claim 8 wherein said joining members are generally tubularly shaped to provide substantially uninterrupted coolant passages between said adjacent rods.

10. The combination of claim 9 including a plurality of tubular spacers secured laterally to the outer surfaces of at least some of said fuel rods which are disposed at the outer periphery of said assembly, said spacers being disposed circumferentially and longitudinally of said assembly to space said assembly from adjacent components of said reactor, and said spacers being shaped to conduct a reactor coolant fluid longitudinally adjacent said outer surfaces.

References Cited by the Examiner
UNITED STATES PATENTS

| | | | |
|---|---|---|---|
| 2,505,695 | 4/1950 | Villiger et al. | |
| 2,735,658 | 2/1956 | Cook. | |
| 2,841,545 | 7/1958 | Zinn | 204—193.2 |
| 2,848,404 | 8/1958 | Treshow | 204—193.2 |
| 2,898,280 | 8/1959 | Schultz | 204—193.2 |

FOREIGN PATENTS

| | | |
|---|---|---|
| 685,848 | 1/1953 | Great Britain. |

OTHER REFERENCES

ASME Paper No. 56–A–166, The Yankee Atomic Electric Plant, November 1956.

Starr, Proceedings of the International Conference on the Peaceful Uses of Atomic Energy, vol. 3, 1955, pp. 99, 102, and 106.

TID–7529 (Part 1), Reactor Heat Transfer Conference of 1956, November 1956, pages 248–261 and 274.

L. DEWAYNE RUTLEDGE, *Primary Examiner.*

ROBERT L. CAMPBELL, CARL D. QUARFORTH, REUBEN EPSTEIN, *Examiners.*

R. C. LYNE, R. L. GRUDZIECKI, *Assistant Examiners.*